United States Patent [19]

Scanlon et al.

[11] 4,354,739
[45] Oct. 19, 1982

[54] COLOR ABSORPTION-TYPE FILTER AND METHOD OF MAKING

[75] Inventors: Robert T. Scanlon, Santa Rosa; Robert M. Gelber, Sebastapol, both of Calif.

[73] Assignee: Optical Coating Laboratory, Inc., Santa Rosa, Calif.

[21] Appl. No.: 183,849

[22] Filed: Sep. 3, 1980

[51] Int. Cl.³ .......................... G02B 5/22; H04N 5/72
[52] U.S. Cl. ..................................... 350/311; 350/316; 350/1.6; 350/166; 350/320; 350/276 R; 358/253
[58] Field of Search ............... 350/311, 316, 318, 166, 350/172, 173, 276 SL, 1.6, 320, 276 R; 358/292, 293; 355/71; 356/404, 416, 422

[56] References Cited

U.S. PATENT DOCUMENTS 2,809,570 10/1957 Dearing et al. ..................... 350/173
3,429,733 2/1969 Wolf et al. ........................... 350/1.6
3,588,215 6/1971 Singh .................................... 350/311
3,717,399 2/1973 Taylor et al. ........................ 350/166
3,873,868 3/1975 Robinder ............................. 358/252
4,145,113 3/1979 Ranninger et al. ................. 350/166

OTHER PUBLICATIONS

Murphy; H. M., *IBM Tech. Dis. Bull.*, vol. 16, No. 3, Aug. 1973, p. 745.

*Primary Examiner*—Jon W. Henry
*Attorney, Agent, or Firm*—Flehr, Hohbach, Test, Albritton & Herbert

[57] ABSTRACT

A contrast enhancement filter is produced by photographic reproduction of a master filter on to positive color transparency film. The master filter may be a multilayer thin film optical filter. The developed positive color transparency film may be laminated between a pair of glass sheets with layers of an ultraviolet absorbing polymer material.

11 Claims, 8 Drawing Figures

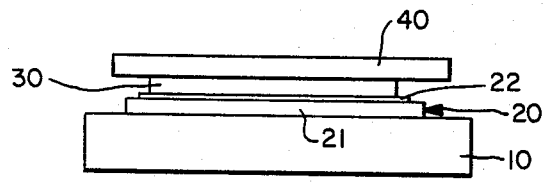
FIG.—1
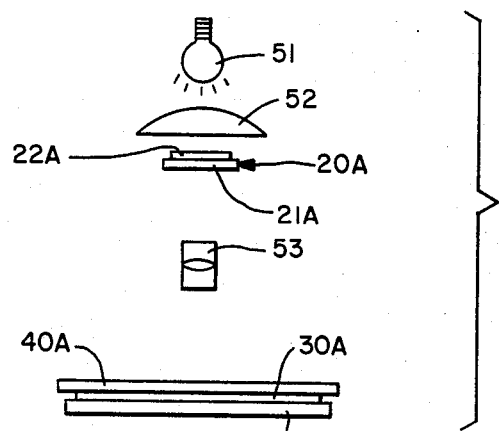
FIG.—2
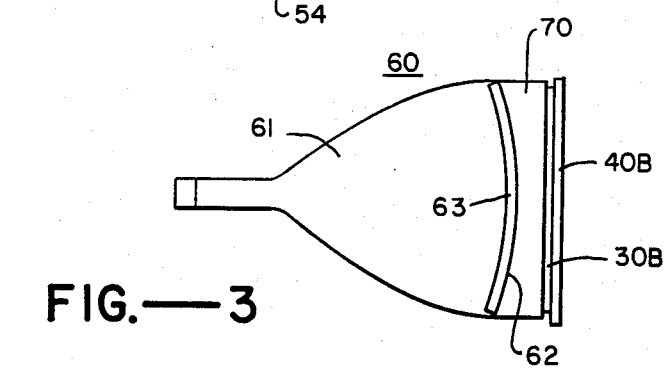
FIG.—3
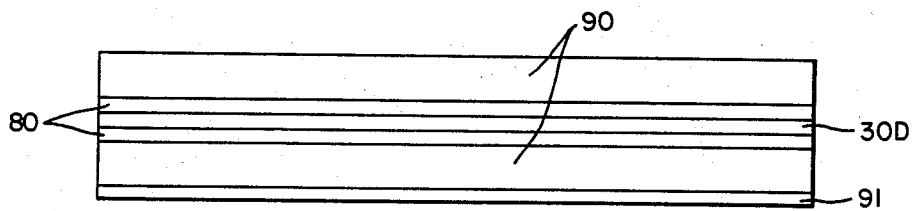
FIG.—4

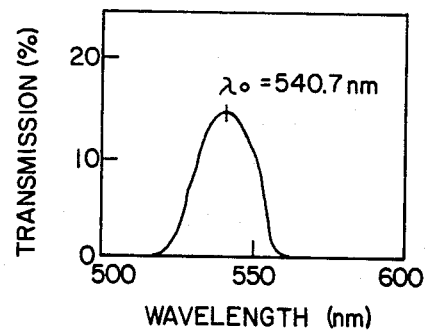
FIG.—5
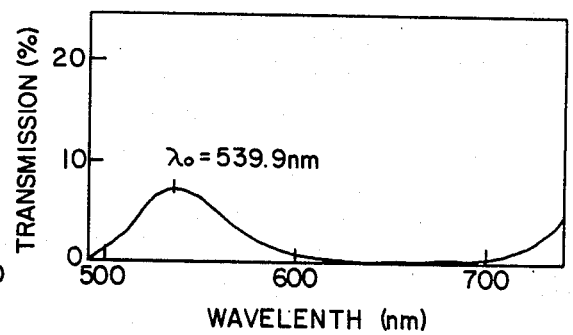
FIG.—6
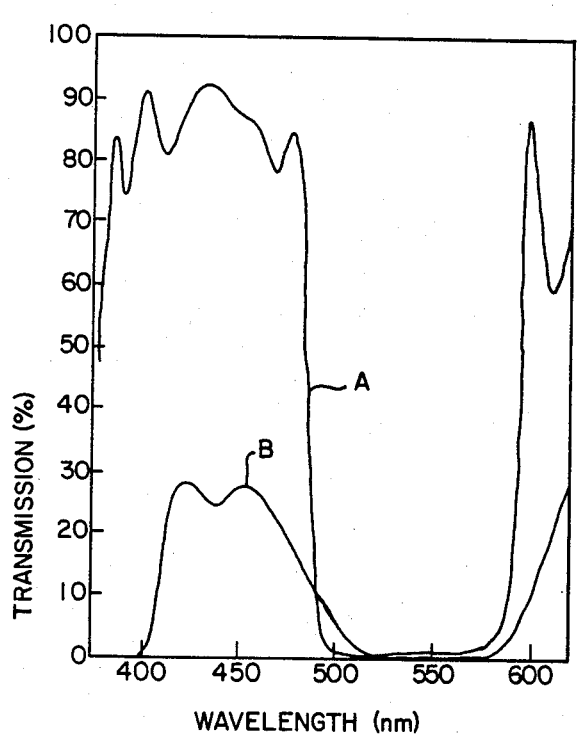
FIG.—7
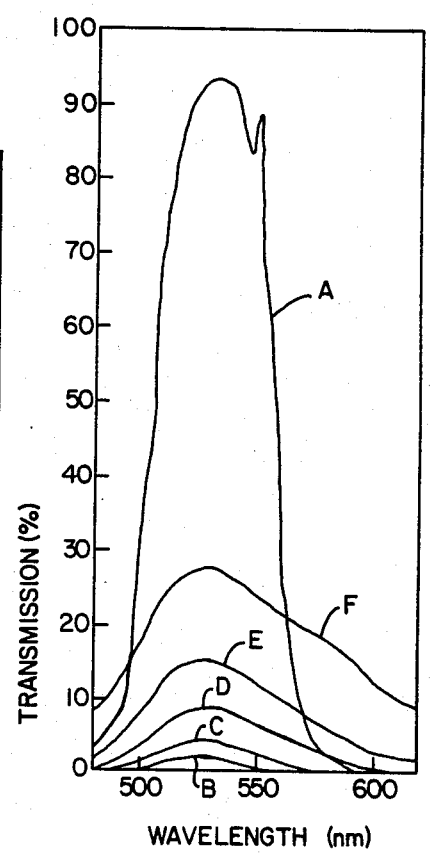
FIG.—8

COLOR ABSORPTION-TYPE FILTER AND METHOD OF MAKING

This invention relates generally to contrast enhancement filters and, more particularly, to selective color absorption-type contrast enhancement filters and methods of manufacturing such filters.

Contrast enhancement filters for light-emitting display devices generally function by enhancing the signal-to-noise ratio for the image on the display device. In this case the signal is the light emitted by the display device itself, for example, the excited areas of phosphor on a CRT screen, and the noise is the ambient light reflected off the face of the display device. One type of contrast enhancement filter is a simple gray screen mounted in front of the display device and having a relatively uniform transmission of all visible wavelength components of about fifty percent, for example. With such a gray screen the light emitted by the display device is attenuated by fifty percent but the ambient light passing through the gray screen and reflecting from the display device back through the gray screen is attenuated by at least a total of seventy-five percent which produces a substantial increase in the signal-to-noise ratio.

If the display device emits colored light having wavelength components in a selected region of the visible spectrum, additional enhancement of the signal-to-noise ratio can be achieved by utilizing a contrast enhancement filter which is substantially transmissive for the wavelength components of the light emitted by the display device and highly absorptive for other wavelength components in the visible spectrum. For example, if the display device incorporates a green light emitting phosphor, use of a contrast enhancement filter which is substantially transmissive for green light wavelength components and highly absorptive for all other color components of the visible spectrum will produce virtually complete attenuation of all components of ambient light except green incident on the filter-display device combination with corresponding overall enhancement of the signal-to-noise ratio for the green light components. The most common form of these wavelength selective filters are colored plastic sheets. However, plastic is soft and easily scratched. In addition, the light reflected off the front surface of the plastic sheet itself constitutes a noise signal.

Another method of producing color absorbing-type of contrast enhancement filters is the use of selectively dyed sheets of polyvinyl butyral (PVB) in a glass-laminate system, where the PVB is placed between two sheets of glass and laminated in an autoclave process to produce a single unit. The front sheet of glass is coated with an anti-reflection coating to reduce reflection. This filter is highly durable as compared to a piece of plastic.

Dyed PVB filters generally have good characteristics for contrast enhancement as they are highly absorptive for visible light in wavelength regions outside the bandpass wavelength region of the filter. However, dyed PVB filters have several distinct limitations. One of these limitations is the inability to place the bandpass region of the filter at a wide variety of wavelengths within the visible light spectrum. This results from the unavailability of effective dyes which produce various spectral response characteristics of the dyed PVB sheets. In addition there is a lack of narrow band and short wave pass dyes. Generally, dyes for yellow, green, blue and amber PVB filters are the only ones available today. Another limitation of dyed PVB filters is the difficulty in controlling the dyeing process as the density level of the dye is increased to narrow the band width of the filter. Dyed PVB filters are also susceptible to ultraviolet fading and are relatively costly to produce.

Another method of producing color-selective filters is the use of thin film multi-layer filter techniques. These filters can provide extremely high degrees of color separation. However, they do not work by absorption and they reflect wavelength components which are not transmitted. This high reflection makes them useless as contrast enhancement filters even though their transmission band can be custom-tailored to match display light output.

It is a general object of this invention to provide a color absorption-type of contrast enhancement filter for which a wide variety of wavelength responses can be obtained.

It is another object of this invention to provide a color absorption-type contrast enhancement filter which can be reproduced photographically.

It is another object of this invention to provide a color absorption-type of contrast enhancement filter which is resistant to ultraviolet fading.

It is another object of this invention to provide a method of photographically reproducing a color absorption-type filter It is another object of this invention to provide a method of photographically reproducing a color absorption filter utilizing a reflective-type master bandpass filter.

In accordance with one aspect of this invention the above objects are achieved by a method of producing a color absorption-type contrast enhancement filter which comprises the steps of:
 exposing a sheet of positive color transparency film to a source of light having preselected wavelength components in the visible spectrum; and
 developing the film to produce a filter element which is substantially transmissive for the preselected wavelength components and highly absorptive for other wavelength components of the visible spectrum.

One approach to the step of exposing the film is to dispose a master filter in front of a white light source with the master filter having a prearranged spectral transmittance characteristic consisting of high transmittance for the preselected wavelength component and either high reflectance or high absorption for other wavelength components and then to expose the sheet of film to the spectral components of light transmitted through the master filter. Preferably the master filter is a multilayer thin film optical filter of whose prearranged spectral transmittance characteristic consists of a high transmittance region including the preselected wavelength components and a high reflectance region for other wavelength components.

Another approach to exposing the film involves direct exposure of the film to the light emitted from the type of display device for which the contrast enhancement filter is designed.

The method of this invention also may include a step of laminating the photographically reproduced filter element between a pair of glass sheets with intervening layers of ultraviolet (UV) absorbing polymer material such as a UV absorbing PVB sheet. A high efficiency anti-reflection coating may be provided on one of the glass sheets which will serve as the front surface.

In accordance with another aspect of this invention, a color absorption-type contrast enhancement filter is provided as comprising a sheet of exposed and developed positive color transparency film, a pair of sheets of ultraviolet absorbing polymer material and a pair of glass plates, laminated together with the film in the center and the glass plates as the outer layer, the film being characterized by substantial transmission for preselected wavelength components of visible light and high absorption for other wavelength components of visible light.

One of the advantages of the method and article of this invention is that the bandpass transmittance region of the filter can be prearranged to occupy any selected portion of the visible light spectrum. This is readily achieved utilizing a master filter in the form of a multilayer thin film optical filter which is designed to have a bandpass region occupying a selected portion of the visible light spectrum. Consequently, a wide variety of wavelength responses can be achieved. In addition, it is relatively simple to control the transmittance of the filter in the wavelength region of interest by controlling the level of exposure of the film.

Another advantage of the article and method of this invention is that they enable ready production of contrast enhancement filters which provide chrominance contrast. Chrominance contrast is achieved by providing a filter which transmits not only the wavelength component of the light emitted by the display device, but other wavelengths as well. For example, a blue transmitting filter may be produced which transmits not only the green light emitted by the display device but also the blue wavelength components of the ambient light incident on the filter. In this fashion, the resulting display is green on blue which provides a preferred display characteristic.

Filters made in accordance with this invention also have improved performance characteristics compared to dyed PVB filters because they provide stronger attenuation of light wavelength components outside the passband.

Other objects, features, and advantages of this invention will be apparent from the following detailed description taken in conjunction with the accompanying drawings.

FIG. 1 is a schematic diagram of one type of apparatus useful in carrying out a step of the method of this invention.

FIG. 2 is a schematic diagram of an alternative form of apparatus for carrying out a step of the method of this invention.

FIG. 3 is a schematic diagram of another alternative approach to carrying out a step of the method of this invention.

FIG. 4 is a section view illustrating the structure of a color absorption-type filter in accordance with this invention.

FIG. 5 is a graph of the spectral transmittance characteristic of a laminated color glass master filter.

FIG. 6 is a graph of the spectral transmittance characteristics of a color absorption filter photographically reproduced from the master filter of FIG. 5 in accordance with the method of this invention.

FIG. 7 is a graph of the spectral transmittance characteristics of a master filter of the multilayer optical filter type and a superimposed graph of the spectral transmittance characteristics of a color absorption filter photographically reproduced from the master in accordance with the method of this invention.

FIG. 8 consists of superimposed graphs of the spectral transmittance characteristics of a master multilayer optical filter and a plurality of photographically reproduced filters utilizing different exposure levels through the master.

Stated generally, the method of this invention for producing contrast enhancement filters involves photographic reproduction on positive color transparency film using one or more exposing light sources which have spectral wavelength components corresponding to the desired spectral response characteristic of the filter element to be produced. Accordingly, employment of the method of this invention involves first ascertaining the desired spectral response characteristics of the filter to be produced. Generally this selection process is tailored to the characteristics of the display device on which the filter is to be employed and also takes into account the type of contrast enhancement characteristics desired. As will later be seen, various approaches may be taken to implementing the method steps of this invention. However, some of the approaches are limited in terms of the filter response characteristics which they can produce. Consequently, implementation of the method of this invention is dependent on the desired response characteristics.

Consider first of all the production of a contrast enhancement filter for a CRT display device which utilizes a phosphor screen emitting light of essentially a single color, i.e., the wavelength components of the emitted light are within a relatively narrow region of the visible light spectrum. As previously explained, two different types of contrast enhancement filters may be employed in connection with such a display. The first type is a filter which has a transmission band which includes wavelength components essentially matching the wavelength components of the emitted light from the display. For example, if a green light is emitted from the phosphor screen, the contrast enhancement filter would be provided with a bandpass transmission region centered in the green region of the visible light spectrum so that it is substantially transmitting in that portion of the spectrum and has high absorption for other wavelength components in the visible light spectrum. An alternative approach to contrast enhancement of such a display involves a chrominance contrast approach in which the filter is designed to have a bandpass transmission characteristic broader than the wavelength component emitted by the display in order to provide color contrast between the displayed image and the background. For example, with a green light emitting display, a filter which transmits in the blue region of the spectrum would provide for both transmission of the emitted green light output of the displayed image and a general blue background for an overall green-on-blue image.

Generally, two different approaches may be utilized to produce a simple contrast enhancement filter having a bandpass transmission characteristic including only the wavelength components of the emitted light from the display device. Generally, these two methods may be designated the master filter method and the direct exposure method. Consider first the master filter approach. The master filter approach involves disposing in front of a white light source a master filter having a prearranged spectral transmittance characteristic consisting of high transmittance for the preselected wavelength components corresponding to those of the display device and either a high reflectance or high absorption for other wavelength components and then exposing a sheet of positive color transparency film to the spectral components of light which are transmitted through the master filter. In some situations it may be possible to utilize a master filter of the color absorption type where it is possible to obtain a colored glass filter which has the bandpass transmittance characteristics which match the wavelength components of the light emitted from the display device. In general, however, it will be preferable to utilize a master filter in the form of a multilayer thin film optical filter which can readily be designed and produced using well-known thin film optical coating technology.

Multilayer thin film optical filters are generally of the bandpass filter or edge filter type. The general design theory for such filters is set forth in Chapters 6 and 7 of Macleod, *Thin-Film Optical Filters*, American Elsevier (New York 1969). In addition, Chapter 8 of Macleod generally details various production methods for thin film optical filters. Today, computer-aided design techniques are employed to produce an initial filter design, with design refinements typically being made using reiterative manufacture of engineering samples, testing of the spectral response and adjustment of the design. Actual construction of multilayer thin film filters is typically performed in vacuum evaporation chambers and such filters typically involve the deposition of a large number of layers of selected high and low refractive index materials with each layer having a design thickness generally related to the design wavelength of the filter. Since the design and manufacture of the master multilayer thin film optical filter employs conventional techniques, it is not necessary to set forth these techniques in detail herein.

For the simple filter case discussed above, the master multilayer thin film optical filter would be a bandpass filter with the center of the bandpass at the wavelength component of the light emitted by the display device. The passband of the filter would generally encompass those wavelength components typically emitted by the phosphor of the CRT screen or other display device. Once this multilayer thin film master filter is produced, several approaches may be taken to implementing the method of this invention by photographically reproducing the spectral characteristics of the filter onto a sheet of positive color transparency film. Generally the technique employed is to dispose the master filter element in front of a white light source and then to expose the emulsion layer on the positive color transparency film to the wavelength components of light passing through the master filter. This can be done in basically two ways as depicted in FIGS. 1 and 2 of the drawings.

FIG. 1 shows a contact printing arrangement in which a light box 10 is utilized to provide uniform illumination of the master filter 20. A sheet of positive color transparency film 30 is provided with the emulsion directly in contact with the filter 20 and a film hold down plate 40 is provided for assuring good contact between the filter 20 and the film 30. As shown, the filter 20 in this case is a thin film optical filter which is typically composed of a transparent glass substrate 21 and a thin film optical coating 22 deposited thereon. No attempt is made in FIG. 1 to accurately reproduce the thicknesses of the various components but only to schematically depict the arrangement for contact printing of the master filter 20 onto the photographic film 30. Contact printing is a standard reproduction technique and details of exposure control and other aspects thereof need not be given here.

FIG. 2 depicts how a typical photoenlarging setup could be utilized to expose the positive color transparency film sheet 30A to light transmitted through a master filter 20A. The typical photoenlarger setup involves a white light source 51 whose emitted rays are collected in a collecting lens 52 for uniform illumination of the master filter 20A. In this case master filter 20A is again a thin film optical filter with a glass substrate 21A and a thin film optical coating 22A formed thereon. However, in this case, the master filter element 20A may be much smaller than that required for the contact printing approach of FIG. 1. A focusing lens arrangement 53 is provided between the master filter 20A and the film holder 54 which carries the photographic film 30A. To hold the film 30A flat on the holder 54 a glass holddown plate 40A may bve provided or the film 30A may be placed on a conventional easel arrangement which holds the film flat. Utilizing the technique of FIG. 2, the focusing lens 53 would typically be positioned to focus at infinity so that any irregularities in the glass plate 21A of the master filter will not be reproduced on the photographic film 30A.

Once photographic film 30 or 30A has been exposed to the light transmitted through the master filter, it may be developed in a conventional color transparency developing fashion to produce a filter element which is substantially transmissive for the preselected wavelength components of the light transmitted through the master filter and highly absorptive for other wavelength components in the visible light spectrum.

Once this filter element has been produced, it is preferable, in accordance with this invention, to laminate the filter element between a pair of transparent glass sheets utilizing intervening layers of an ultraviolet absorbing polymer material such as a UV absorbing PVB film. FIG. 4 generally depicts the crosssectional appearance of such a laminated filter structure. The exposed and developed film 30D is sandwiched between a pair of UV absorbing PVB sheets 80 with the glass plates 90 forming the outer layer of the structure. A high efficiency anti-reflection coating 91 may be provided on one of the glass plates 90 to serve as a front surface of the contrast enhancement filter. This anti-reflection coating reduces front surface reflection to further enhance the signal-to-noise ratio of the overall system. The laminating process is a conventional one and typically involves placing the assembled sheets together in an autoclave operating at a temperature of about 210° F. for several hours. Actual filter samples produced in this manner successfully passed a ten-day humidity test in accordance with MIL STD 810B. These samples were also exposed to ultraviolet radiation in an ultraviolet exposure chamber with half of the samples covered with aluminum foil. Examination of the respective exposed and unexposed areas showed no visible difference in the filter appearance after a twenty-one day exposure.

FIG. 3 depicts an alternative approach to the step of exposing the positive color transparency film where it is desired to produce a simple contrast enhancement filter element having spectral characteristics matching the wavelength components of the light emitted from the display device. FIG. 3 illustrates a CRT display device which typically comprises an evacuated glass envelope 61 having a face panel 62 with a light emitting phosphor 63 provided on the interior surface of the face panel 62. Utilizing a collimator 70, a sheet of positive transparency film 30B may be uniformly exposed to the light emitted from phosphor layer 63. Utilizing this technique the phosphor layer 63 would be uniformly excited by a scanning electron beam in order to provide uniform illumination of film sheet 30B. Once film sheet 30B has been exposed to the light emitted from the display phosphor, the film may be developed in a conventional fashion to produce a filter element which is substantially transmissive for the wavelength components of the light emitted from phosphor layer 63 and highly absorptive for other wavelength components in a visible spectrum. After developing film layer 30B, the developed film sheet may be laminated in the previously described manner to produce a final filter structure as depicted in FIG. 4.

Consider now the case where a contrast enhancement filter providing chrominance contrast it to be produced. For this case the use of a master filter for exposure of the positive transparency color film is mandatory since the appropriate spectral characteristics for a chrominance contrast type of filter can only be achieved in this manner. In other words, the direct exposure approach depicted in FIG. 3 cannot be utilized since the filter must be exposed to other wavelength components in the visible spectrum in addition to those emitted by the phosphor layer 63 of the display device. Accordingly, to produce a chrominance contrast type filter, a master multilayer thin film optical filter is designed and produced to have a passband which includes the wavelength components which are desired to be included in the transmission band of the filter element. Using the example previously given, the master filter would be designed to transmit wavelength components in the blue region of the spectrum to produce a green on blue image from a green light emitting display device. It should be appreciated that the effect is not just limited to these colors.

While the method of this invention has been discussed above in connection with a CRT type display device utilizing a light emitting phosphor layer, it should be understood that the contrast enhancement filter produced in accordance with the method of this invention could also be employed with other types of light emitting display devices such as light emitting diode (LED) displays, vacuum fluorescent displays (VFD), electroluminescent (EL) displays, etc.

The principles of the method of this invention can also be employed in connection with display devices which involve multicolor light emission. For example, some CRT display devices generate variable color displays utilizing a plurality of phosphor materials. A contrast enhancement filter for such a display device can be made by exposing the sheet of positive color transparency film to light beams having the preselected wavelength components of the light emitted from the various phosphors in the display device. It should be apparent that this exposing of the film can be accomplished either directly utilizing the display device by sequentially exciting the various phosphors. In addition, it should be understood that a multicolor filter element could be produced by sequential exposure of the film through different master filters, each having spectral transmittance characteristics matching the light emitted from one of the phosphors. After the plural exposure of the film, it again may be developed in a conventional fashion and laminated into the final filter structure depicted in FIG. 4.

FIGS. 5 and 6 depict the spectral response characteristics of a master filter (FIG. 5) and a photographically reproduced filter (FIG. 6). FIG. 5 represents the spectral transmission characteristics of a laminated filter designed to be used with the phospher designated P-43, which generally consists of a Schott S-8005 green glass sheet and a Schott BG-36 glass sheet laminated together with an intervening sheet of clear PVB. As shown in FIG. 5 the P-43 filter has a transmission band centered at a wavelength of approximately 540 nanometers and a full-width-at-half-maximum bandwidth of 24 nanometers. As shown in FIG. 6, the center wavelength of the photographically reproduced filter element remains at the 540 nanometer position but the full-width-at-half-maximum bandwidth is considerably wider and has a value of about 55 nanometers. The filter characteristics depicted in FIG. 6 are for a particular exposure level of the photographic film through the master filter. The transmission level in the bandpass region can be controlled by controlling the exposure level of the film to the light passing through the master filter. As demonstrated by the spectral response curve of FIG. 6, the filter has substantial transmission in a certain passband but is highly absorbing in other wavelength regions. The filter depicted in FIG. 6 also has a secondary passband with higher transmission centered at about 825 nanometers which is of no consequence in the contrast enhancement filter application. Although the percentage transmission of the filter depicted in FIG. 6 is relatively low, it still serves a useful function as a contrast enhancement filter since the level of illumination of the display can be controlled by the degree of excitation of the phosphor and the total light emitted therefrom. The selective transmission of the filter provides the enhanced signal-to-noise ratio for the emitted wavelength component of the display device with strong attenuation of the ambient light passing in both directions through the filter, including virtual full absorption of most non-signal wavelength components in the visible light spectrum.

FIG. 7 depicts the results of photographic reproduction of a master filter which is in the form of a multilayer thin film optical filter having a magenta color transmission characteristic. Curve A of FIG. 7 represents the spectral transmission characteristic of the magenta master filter which has a band width of approximately 110 nanometers with a center wavelength of about 403 nanometers. Curve B illustrates the spectral transmission characteristics of a photographic reproduction of the magenta master. Comparing Curves A and B it can be seen that Curve B reproduces quite faithfully the overall spectral response characteristics of the multilayer thin film master represented by Curve A. Even though the transmission levels in the passband region of the photographically reproduced filter are not as high as the master filter and the slopes of the transition regions and the band width are not reproduced with complete accuracy, the photographically reproduced filter would provide highly satisfactory contrast enhancement function.

FIG. 8 depicts the spectral response characteristics of a multilayer thin film master filter having a passband centered at about 530 nanometers which provides green color transmission. Curves B, C, D, and F in FIG. 8 illustrate the spectral transmission characteristics of photographically reproduced color transparencies utilizing the master filter and different exposure times with the higher exposure times producing the color transparency filter element with the highest transmission level but also the widest band width.

All of the sample photographically reproduced filters depicted in the graphs of FIGS. 6, 7, and 8 were made utilizing Kodak Ektachrome daylight film No. 64, but other types of positive color transparency film could also be utilized; and it is believed that, to some extent, the spectral response characteristics can be adjusted by proper selection of the film type used for photographic reproduction of the master filter.

It should be apparent from the above description of this invention that the location of the passband of the photographically reproduced filter can be positioned at any wavelength within the visible light spectrum. This is accomplished by designing the master filter to have a passband in the desired wavelength region. Accordingly, the method of this invention provides complete flexibility in producing a variety of filter characteristics. It provides the advantages of the multi-layer interference filter while converting the rejection mechanism from reflection which is not practical for contract enhancement to absorption which is highly useful. It should thus be apparent that the contrast enhancement filters produced in accordance with the method of this invention can be designed to provide contrast enhancement for any type of color light emitting display device. The contrast enhancement performance of such filters is superior to dyed PVB filters due to the greater attenuation of wavelength components of ambient light outside the passband of the filter than is provided in the dyed PVB filters. The filters produced in accordance with this invention have a high resistance to fading under UV exposure and, utilizing the lamination structure depicted in FIG. 4, the filters of this invention have high resistance to degradation from humidity in the environment.

It should be understood that the above description of various embodiments of the method and article of this invention are given by way of example only, and numerous modifications could be made therein by those of skill in this art without departing from the principles of this invention as set forth in the following claims.

What is claimed is:

1. A method of producing a color absorption-type contrast enhancement filter comprising the steps of:
   exposing a sheet of positive color transparency film uniformly across its entire area to at least one source of light having wavelength components in the visible spectrum preselected in accordance with the required optical response characteristic of said filter; and
   developing said film to produce a filter element which is substantially transmissive for said preselected wavelength components and highly absorptive for other wavelength components of the visible spectrum across said entire area of said film.

2. The method of claim 1, wherein said exposing step comprises:
   disposing in front of a white light source a master filter having a prearranged spectral transmittance characteristic consisting of high transmittance for said preselected wavelength components and either high reflectance or high absorption for other wavelength components; and
   exposing said sheet of film to spectral components of light transmitted through said master filter.

3. The method of claim 2, wherein said master filter comprises a multilayer thin film optical filter having a spectral transmission characteristic consisting of high transmittance for said preselected wavelength components and high reflectance for other wavelength components.

4. The method of any of claims 1, 2 or 3, further comprising the step of laminating said filter element between a pair of glass sheets with intervening layers of an ultraviolet absorbing polymer material.

5. In a method of producing a color absorption-type contrast enhancement filter for display device emitting colored light in a predetermined region of the visible spectrum, the steps of;
   exposing a sheet of positive color transparency film across its entire area to a uniform beam of light having prearranged wavelength components including said predetermined region of the visible spectrum; and
   developing said film to produce a filter element which is substantially transmissive for light in the spectral region of said exposing light beam and highly absorptive for light in other spectral regions said response characteristic of said film being substantially uniform across the entire area thereof.

6. The method of claim 5, wherein said exposing step comprises exposing said film to light emitted from said display device.

7. The method of claim 6, wherein said exposing step comprises:
   disposing in front of a white light source a master filter having a prearranged spectral transmission characteristic consisting of high transmittance for said prearranged wavelength components and either high reflectance or high absorption for other wavelength components; and
   exposing said sheet of film to spectral components of light transmitted through said optical filter.

8. The method of claim 7, wherein said master filter comprises a multilayer thin film optical filter having a spectral transmittance characteristic consisting of high transmittance for said preselected wavelength components and high reflectance for other wavelength components.

9. The method of any of claims, 5, 6, 7, or 8, further comprising the step of laminating said filter element between a pair of glass sheets with intervening layers of an ultraviolet absorbing polymer material.

10. A color absorption-type contrast enhancement filter comprising a sheet of exposed and developed positive color transparency film, a pair of sheets of ultraviolet absorbing polymer material, and a pair of glass plates laminated together with said film in the center and said glass plates as the outer layer, said film being characterized by substantial transmission for preselected wavelength components of visible light and high absorption for other wavelength components of visible light.

11. The article of claim 10, wherein said film is produced by exposing a sheet of positive color transparency film to a source of light having preselected wavelength components in the visible spectrum; and developing said film to produce a filter element which is substantially transmissive for said preselected wavelength components and highly absorptive for other wavelength components of the visible spectrum.

* * * * *